July 11, 1961     R. J. BERNOTAS     2,991,664
FLUID LOCK DIFFERENTIAL
Filed Oct. 18, 1957     2 Sheets-Sheet 2
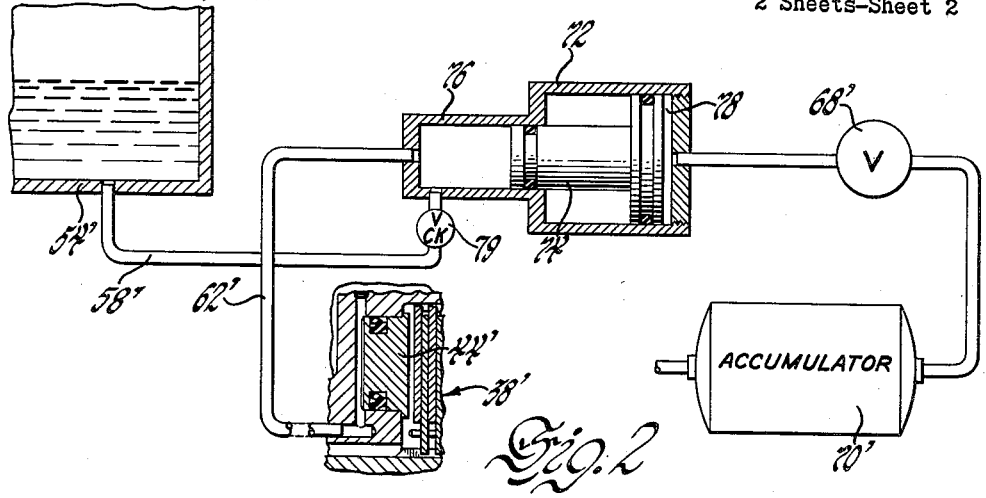
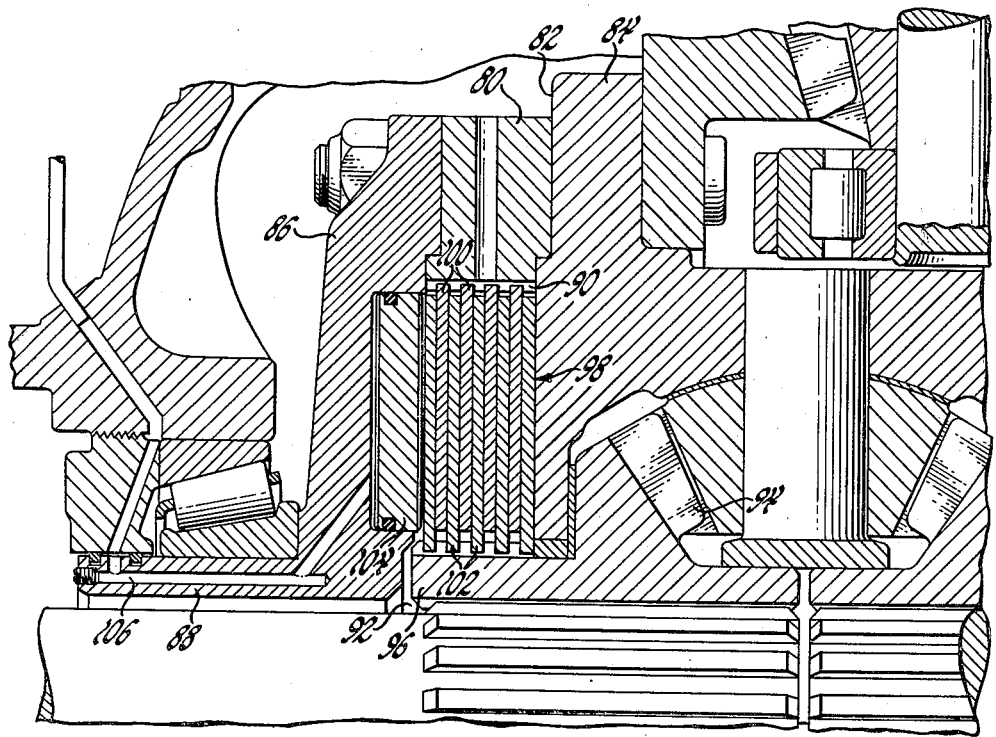
INVENTOR.
Ralph J. Bernotas
BY
R. F. Barnard
ATTORNEY.

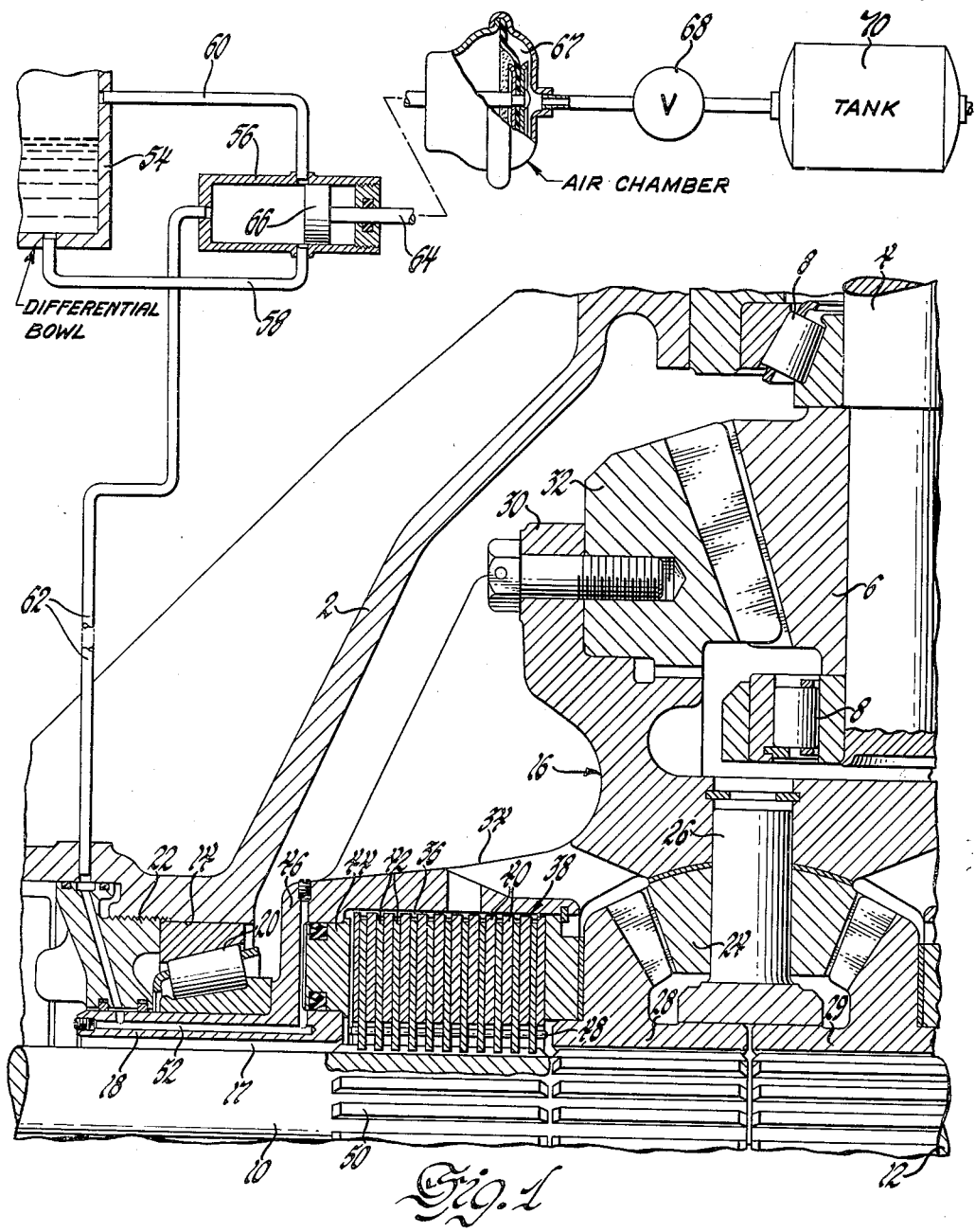

United States Patent Office 2,991,664
Patented July 11, 1961

2,991,664
FLUID LOCK DIFFERENTIAL
Ralph J. Bernotas, South Euclid, Ohio, assignor to General Motors Corporation, Detroit, Mich., a corporation of Delaware
Filed Oct. 18, 1957, Ser. No. 690,971
4 Claims. (Cl. 74—711)

The present invention relates to differentials and, more specifically, to fluid lock differentials for use particularly in heavy duty off-the-road earth-moving equipment.

To equip heavy duty material handling vehicles, such as large capacity trucks, scrapers, and the like, with a conventional differential construction offers serious disadvantages when the vehicle operates in unstable soil conditions, which is the usual case. While the usual differential action is dseirable in these vehicles, loss of drive and tractive effort from one of the wheels also results as the vehicle traverses soil which is wet or otherwise rendered unstable. Under such circumstances, for example, one drive wheel may at least momentarily lose traction resulting, through the action of the differential and this wheel taking all of the power input, in spinning of the wheel and at least momentary complete loss of traction. Since such conditions frequently occur, and particularly in such vehicles as herein specifically contemplated, it is desirable to provide a differential which can be selectively locked to transmit power equally to all wheels mounted on the axle shaft or shafts.

Therefore, it has become increasingly more apparent that some means is desirable in a conventional differential for locking the latter selectively as required, or desired, to avoid the aforementioned loss of traction. On the other hand, it is also desirable to provide a locking means which may be easily incorporated with existing differential constructions of conventional size.

It is, therefore, a feature and object of the present invention to provide a differential construction which may be selectively locked to transmit equal power to all the wheels mounted on the drive axle or axles.

It is another object of this invention to provide a fluid lock differential construction which is easily adaptable to a conventional differential whereby a minimum amount of modification is required in the latter to adapt it for locking as aforedescribed.

Yet another feature and object of this invention resides, according to one embodiment, in the provision of a multiple disc locking clutch in which one of the elements thereof is directly connectible to the hub of the differential face or side gears to form a subassembly therewith thereby enhancing assembly.

According to another feature and object of this invention, a multiple disc locking clutch assembly is disposed substantially adjacent the wheel-driving axle shafts whereby the clutch assembly is subjected to a minimum amount of deflection occasioned by the thrust of the main drive line at its connection to the differential drive mechanism.

Moreover, according to another feature and object of this invention, fluid pressure means is provided for manually actuating the multiple disc clutch of the differential locking means. According to this feature of the invention, separate and distinct master and slave fluid circuits are employed in which the slave circuit utilizes the normal differential lubricant contained in the differential sump bowl for applying the multiple disc clutch upon actuation of the other or master fluid circuit means, thereby preventing contamination of the differential lubricant which otherwise would be occasioned if some other actuating fluid was used and leaked from the clutch assembly.

In general, these and other features of this invention are obtained in a substantially conventional type of differential comprising a differential cage having rotatably journaled therein a plurality of differential pinions, and oppositely disposed face or side gears in mesh with the differential pinions and secured to coaxial outwardly projecting wheel-driving shafts which extend through a transverse bore in the differential cage. An annular cavity in the differential cage forms a clutch housing which surrounds and opens into the differential cage bore through which the wheel-driving shafts extend, one group of clutch elements being disposed within the cavity for direct connection either to one of these shafts or to the hub of one of the face gears. Accordingly, the area of thrust transmission from the main drive line to the conventional ring gear of such a differential is relatively remote and thereby minimized with respect to the locking clutch. Moreover, a clutch applying piston is contained in a fluid circuit including a slave motor and the differential lubricant sump bowl for utilization of this lubricant fluid for applying the clutch upon actuation of a separate master fluid circuit which may be supplied from any convenient source such as an air or oil operated brake system.

These and other features, objects and advantages of this invention will appear more fully hereinafter as the description of the invention proceeds, and in which reference is made to the following drawings in which:

FIGURE 1 is a fragmentary cross-section of one form of the fluid lock differential of this invention, including the fluid system for the actuation thereof;

FIGURE 2 is a schematic representation of another form of fluid system which may be utilized for controlling the differential of FIGURE 1 or FIGURE 3; and FIGURE 3 is a fragmentary cross-section of another form of the fluid lock differential of this invention.

In the drawings, only those portions of the differential structure have been shown which are necessary to a full understanding of this invention. However, the structural portions eliminated are substantially identical to portions shown. For example, the portion of the differential cage eliminated will be understood to be formed and supported in a manner similar to the portion shown.

Referring now to the drawings, and particularly to FIGURE 1, there is shown a differential housing 2 through the forward end of which a drive shaft 4 projects, and on the inner end of which there is secured a bevel pinion 6. The shaft 4 is suitably journaled in the roller bearings 8 as clearly shown in FIGURE 1. Coaxial wheel-driving shafts 10 and 12 extend into the interior of the housing 2 through oppositely disposed openings defined by the cylindrical portion 14 of the housing wall.

The differential cage 16 includes a transverse bore 17 terminating in oppositely disposed cylindrical, axially outwardly extending support or pilot portions 18 which closely surround the axle shafts 10 and 12 at points radially inwardly spaced from the housing wall portion 14. A plurality of bearing assemblies 20 are interposed between the cage pilot portions 18 and the wall portion 14 of the housing, thereby supporting the differential cage within the housing. An annular thrust nut 22 is threadably received within the housing openings to abut the bearing outer race ring and to adjust the position of the bearing assemblies 20. The usual differential bevel gears 24 are rotatably journaled on a spider member 26 secured within the differential cage, and engage the face gears 28 and 29 splined or otherwise suitably secured to the axle shafts 10 and 12.

The differential cage includes an annular flange 30 to which the ring gear 32 is bolted. As is usual, the ring gear is in mesh with the drive pinion 6 for rotating the differential cage about the axis of the axle shafts 10 and 12. The web portion 34 of the differential cage has formed therein an annular cavity 36 axially spaced between one of the bearing assemblies 20 and the face gear 28, and opens into the bore 17 of the cage adjacent the axle shaft 10. A multiple disc clutch 38 is disposed within the cavity 36 and includes the disc elements 40 splined or otherwise secured within the cavity 36, and a plurality of disc elements 42 splined to the axle shaft 10. An annular clutch applying piston 44 is journaled in an annular aperture in the wall 46 of the differential cage.

It will be noted from FIGURE 1 that a pin 48 extends through apertures in the clutch elements 42 thereby aligning them. The use of this pin enhances the assembly of the clutch elements inasmuch as the apertures therein are so related with respect to the notches which receive the splines 50 of the axle shaft, whereby the pin may be inserted through these apertures to align all the clutch elements for insertion on the shaft.

Fluid pressure is adapted to be supplied through a drilled passage 52 formed through the wall of the housing 2, thrust nut 22, the cage pilot portion 18 and wall 46 to the clutch applying piston 44. It will therefore be seen that application of fluid pressure to the clutch piston 44 will lock the elements 40 and 42, thereby locking the differential cage directly to the axle shaft 10. Since the differential cage is operatively connected to the differential pinions 24, and the face gear 28 is secured to the shaft 10 and in mesh with the differential pinions, the entire differential will be locked thereby supplying power through both axle shafts.

The control means for supplying fluid under pressure to the clutch piston 44 includes two separate and distinct fluid circuits. The numeral 54 indicates a differential sump bowl normally formed as a part of the housing 2 and containing differential lubricant. A slave motor cylinder 56 is disposed below the level of the liquid in the differential bowl 54 so as to be fed with lubricant therefrom by gravity through the line 58. The slave cylinder 56 is also connected to the differential bowl above the level of the liquid contained therein by a vent line 60 to prevent air from being entrapped in the cylinder 56. A pressure line 62 communicates the slave cylinder with the drilled passage 52. The rod 64 of the piston 66 reciprocably disposed in the slave cylinder 56 is connected to a master fluid motor 67 of the reciprocable piston or diaphragm type whereby the slave piston will be reciprocated to supply differential lubricant under pressure to the clutch piston 44 upon actuation of the master motor 67. The master motor is actuated by valve 68 connected to a source 70 of fluid under pressure, such as air, thereby forming a separate and distinct fluid circuit from that containing the slave motor. The supply and vent lines 58 and 60 are connected to the slave cylinder 56 at a point relative to the normal, unactuated position of the piston 66 whereby the latter will close these lines upon reciprocation to supply fluid pressure through the line 62.

In FIGURE 2, another form of fluid control system is shown which retains all the advantages of that shown in FIGURE 1 as well as obtaining additional advantages, primed numerals in FIGURE 2 indicating parts corresponding to FIGURE 1. In the FIGURE 2 embodiment, a single cylinder 72 having axially spaced portions of differing diameters is adapted to receive a dual-headed piston 74 for reciprocation therein. The piston heads separate the cylinder into two distinct chambers 76 and 78 which, respectively, are parts of the slave and master fluid circuits. In this form of the invention, the cylinder 72 is again disposed beneath the level of the liquid in the bowl 54' for gravity feed therefrom, but the aforedescribed vent line 60 has been eliminated. A one-way ball check valve 79 is provided in the supply line 58' to prevent return of fluid through the latter to the bowl 54' upon clutch applying movement of the piston 74. It has been found that the use of the check valve 79 in the line 58' provides more positive action in applying the locking clutch. Moreover, because the check valve is used, the supply line 58' may be connected to the chamber 76 at a position remote from the piston 74 as shown.

Although it is preferable to mount the cylinder 72 below the level of the liquid in the bowl 54' for gravity feed therefrom as specifically disclosed, this cylinder may be mounted above the liquid level if desired. When so mounted, the chamber 76 and pressure line 62' are maintained full of lubricant fluid by the suction resulting from return of the piston 74 to the position shown in FIGURE 2.

In FIGURE 3, another embodiment of the fluid lock differential is shown, and in which primed numerals indicate corresponding parts in FIGURE 1. An annular clutch element ring 80 is rigidly secured to the side wall 82 of the differential cage 84 by the retaining member 86 having the axially extending pilot portion 88 suitably supported within the opening in the differential housing in a manner previously described. An annular clutch cavity 90 is formed between the side wall 82 of the differential cage, the clutch ring 80 and the retaining member 86, and surrounds and opens into the bore 92 of the differential cage through which the axle shafts extend. In this form of the invention, the face or side gear 94 is again splined to the axle shaft, but includes a hub 96 which extends outwardly from the differential spider to a point radially opposite the opening of the annular cavity 90. A multiple disc clutch 98 is disposed within this cavity, and includes the clutch elements 100 splined or otherwise secured to the clutch ring 80, and the clutch elements 102 which extend out of the cavity into direct splined engagement with the hub 96 of the face gear. Again, an annular clutch applying piston 104 is journalled for reciprocable movement in an annular cavity in the inner side wall of the retaining member 86. A drilled passage 106 again communicates the clutch piston to a suitable fluid control means. The control means utilized may take the form of that shown in FIGURE 1 or FIGURE 2.

In addition to providing a structure which may be effectively employed to lock a standard differential as desired, the instant invention has several advantages over those known in the art. For example, the structure of the multiple disc clutch may be quite readily incorporated into an otherwise substantially conventional differential. Moreover, by utilizing the pin 48 in assembling the clutch elements of FIGURE 1, a greater ease of handling and assembly results. Referring more particularly to FIGURE 3, by mounting the clutch elements 102 on the hub of the face gear, a subassembly results which also enhances assembly. Common to the two embodiments is the fact that the multiple disc clutch is disposed substantially adjacent the axis of the wheel-driving shafts and, consequently, remote from the ring gear which receives considerable thrust from the driving bevel pinion. Thus, although the flange of the differential cage is subjected to severe thrusts often resulting in deflections thereof, the effect of this deflection is minimized with respect to the clutch assembly. Finally, it should be noted that the usual differential lubricant is the fluid employed to apply the clutch piston. This is particularly significant inasmuch as it is almost impossible to prevent some leakage from the clutch assembly into the differential itself. Thus, if a separate fluid is utilized for applying the clutch, some of it will leak into the lubricant thereby contaminating the latter. By using the differential fluid as the clutch applying medium, any of it which does leak merely falls back into the differential sump or bowl.

Having shown several embodiments of the invention for illustrative purposes, it should be understood that the invention is not to be limited thereby but only by the scope of the claims which follow.

I claim:
1. In combination, a vehicle having a differential housing including a sump bowl for lubricant, a differential within said housing including driving and driven gear means, fluid pressure operated clutch means for locking said driving means and driven means together to lock said differential, and fluid pressure means for operating said clutch means; said fluid pressure means comprising a cylinder and a piston reciprocably disposed therein, said cylinder being disposed relative to said bowl and connected thereto for gravity feed of fluid from said bowl to said cylinder, and a pressure line connecting said cylinder to said clutch means whereby the latter is applied upon reciprocation of said piston.

2. In combination, a vehicle having a differential housing including a sump bowl for lubricant, a differential within said housing including driving and driven gear means, fluid pressure operated clutch means for locking said driving means and driven means together to lock said differential, and fluid pressure means for operating said clutch means; said fluid pressure means comprising a cylinder having a piston reciprocably disposed therein, said piston and a portion of said cylinder forming a variable volume pressure chamber located below the level of the fluid in said bowl, a supply line connecting said bowl to said chamber for gravity feed of fluid from the former to the latter, a check valve in said line permitting one-way flow of fluid from said bowl to said chamber, and a pressure line connecting said chamber to said clutch means.

3. In combination, a vehicle having a differential housing including a sump bowl for lubricant, a differential within said housing including driving and driven gear means, fluid pressure operated clutch means for locking said driving means and driven means together to lock said differential, and fluid pressure means for operating said clutch means; said fluid pressure means comprising a cylinder and a piston reciprocably disposed therein, said cylinder being disposed relative to said bowl and connected thereto for gravity feed of fluid from said bowl to said cylinder, a pressure line connecting said cylinder to said clutch means whereby the latter is applied upon reciprocation of said piston, master motor means operatively connected to said piston, a source of fluid under pressure communicating with said master motor means, and valve means selectively controlling communication of said source with said master motor means to reciprocate said piston.

4. In combination, a vehicle having a differential housing including a sump bowl for lubricant, a differential within said housing including driving and driven gear means, fluid pressure operated clutch means for locking said driving means and driven means together to lock said differential, and fluid pressure means for operating said clutch means; said fluid pressure means comprising a cylinder having a piston reciprocably disposed therein, said piston and a portion of said cylinder forming a variable volume pressure chamber located below the level of the fluid in said bowl, a supply line connecting said bowl to said chamber for gravity feed of fluid from the former to the latter, a check valve in said line permitting one-way flow of fluid from said bowl to said chamber, a pressure line connecting said chamber to said clutch means whereby the latter is applied upon reciprocation of said piston, master motor means operatively connected to said piston, a source of fluid under pressure, and circuit means including a selectively operable valve communicating said source to said master motor to actuate the latter.

References Cited in the file of this patent

UNITED STATES PATENTS

| | | | |
|---|---|---|---|
| 2,126,849 | Weiss | Aug. 16, | 1938 |
| 2,165,358 | Engel | July 11, | 1939 |
| 2,248,435 | Pleines | July 8, | 1941 |
| 2,268,605 | Mattersdorf | Jan. 6, | 1942 |
| 2,580,381 | Banker | Jan. 1, | 1952 |
| 2,642,972 | Brooks | June 23, | 1953 |
| 2,643,746 | Richter | June 30, | 1953 |
| 2,711,808 | Richardson | June 28, | 1955 |
| 2,734,398 | Bottcher | Feb. 14, | 1956 |
| 2,768,538 | Simonds | Oct. 30, | 1956 |
| 2,830,670 | Ferguson | Apr. 15, | 1958 |
| 2,861,477 | Mueller | Nov. 25, | 1958 |
| 2,894,416 | Scott | July 14, | 1959 |

FOREIGN PATENTS

| | | | |
|---|---|---|---|
| 679,643 | Germany | Aug. 12, | 1939 |
| 1,083,711 | France | Jan. 12, | 1955 |